June 23, 1964 L. A. SINCLAIR 3,138,149
BAIT LAUNCHER
Filed Oct. 18, 1961 2 Sheets-Sheet 1
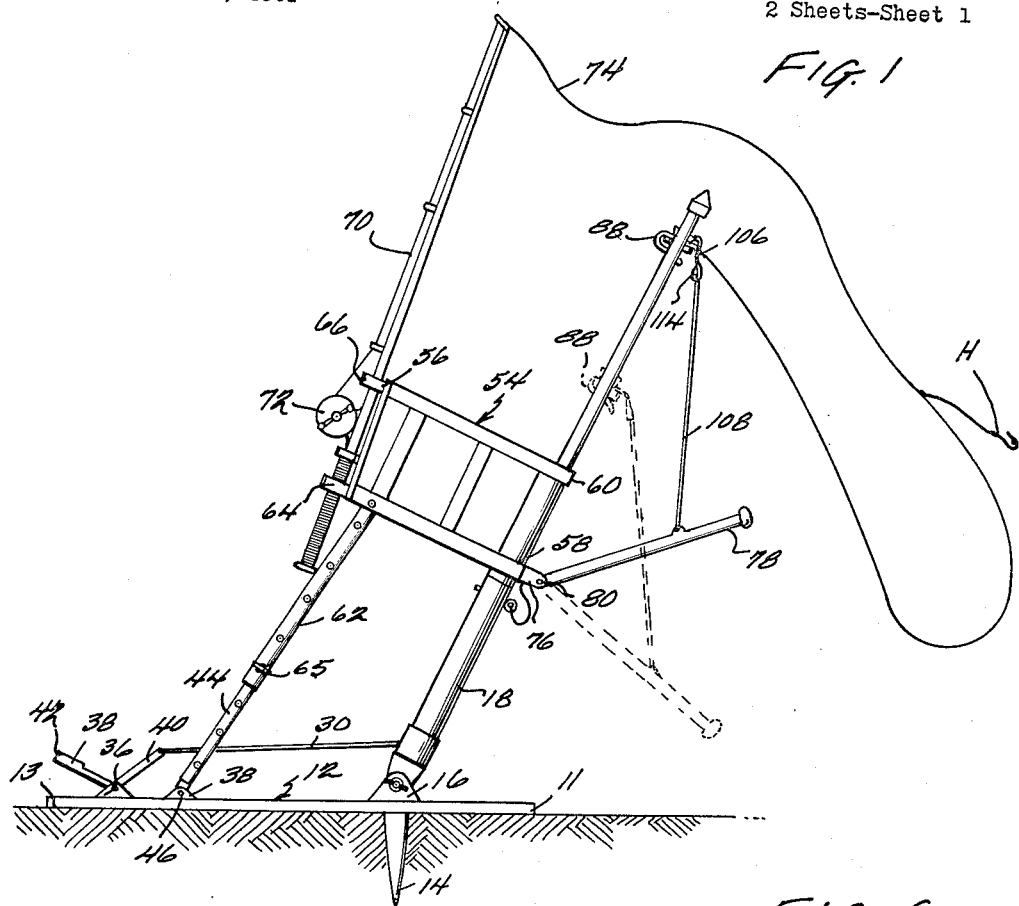
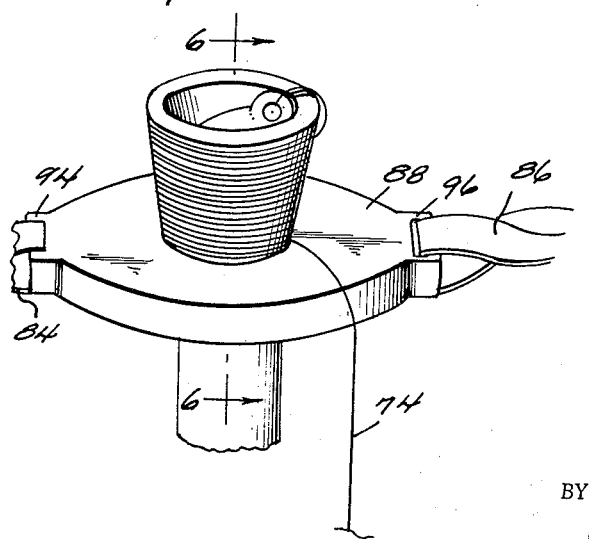
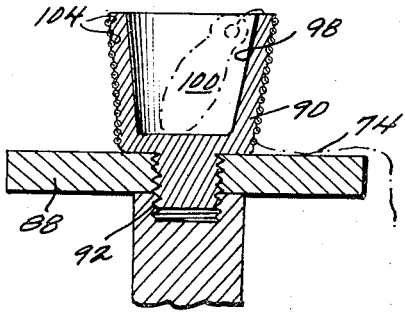
INVENTOR
LEWIS A. SINCLAIR
BY John J. Byrne
ATTORNEY June 23, 1964  L. A. SINCLAIR  3,138,149
BAIT LAUNCHER
Filed Oct. 18, 1961  2 Sheets-Sheet 2
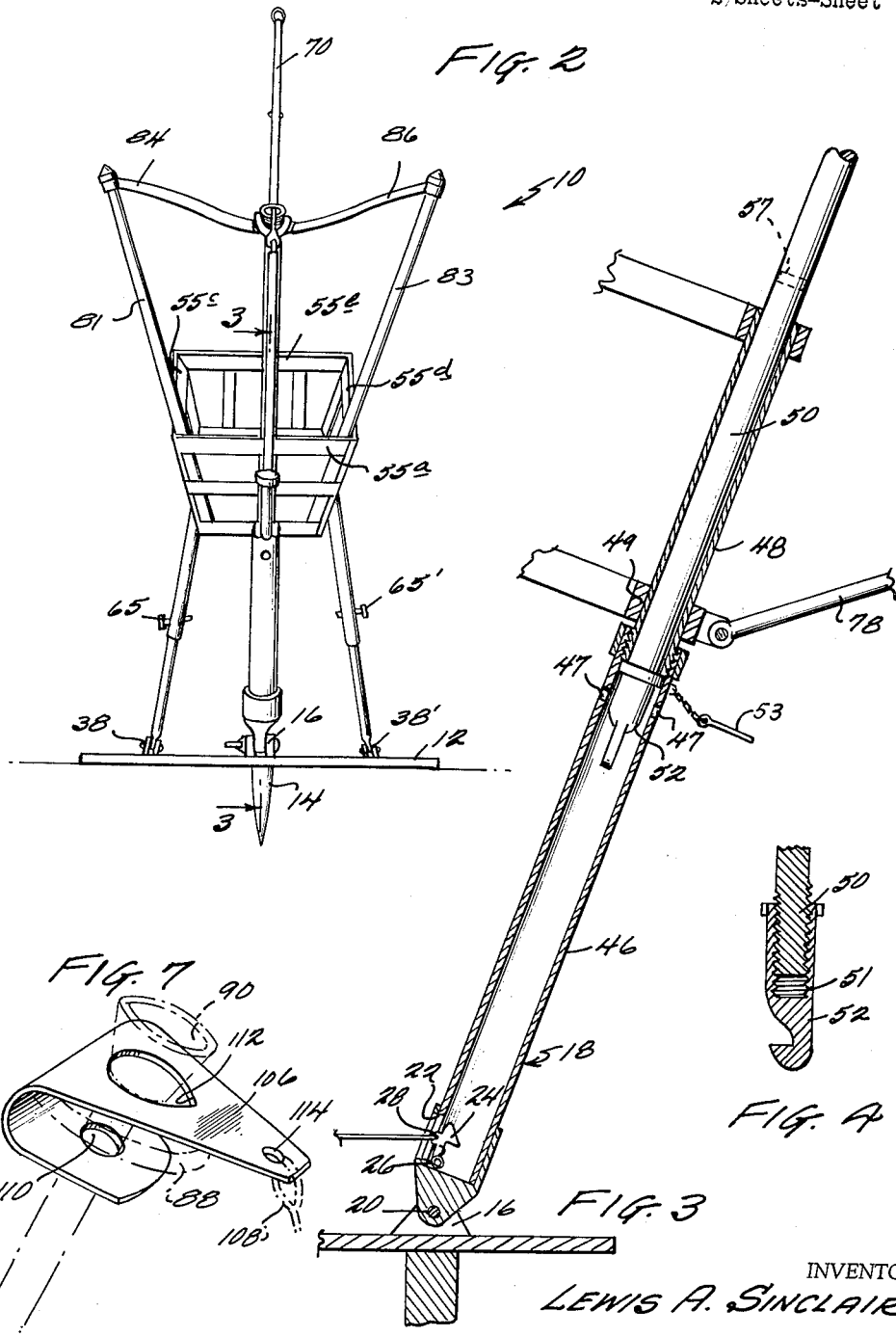
INVENTOR
LEWIS A. SINCLAIR
BY John J. Byrne
ATTORNEY

United States Patent Office 3,138,149
Patented June 23, 1964

3,138,149
BAIT LAUNCHER
Lewis A. Sinclair, 905 Terrace Drive, Annandale, Va.
Filed Oct. 18, 1961, Ser. No. 146,406
6 Claims. (Cl. 124—17)

This invention relates generally to a casting device, and is specifically related to a rig for launching bait or a fishing lure to great distances. In general, the invention provides a framing structure which may be easily secured to the earth's surface near a shoreline, and a launching mechanism for throwing the bait while maintaining the line free from entanglement.

A principal objective of this invention is to provide a casting device of increased ruggedness, of light-weight construction, and having a simple and efficient manner of operation.

A further objective of this invention is to provide an inverted cone-type device about which the fishing line may be wound and the sinker secured during that period prior to launching.

A still further objective of this invention is to provide a device of the type described which may be activated via a foot pedal so that both hands are free to manipulate the casting rod.

A still further objective of the invention is to provide a launcher wherein the framing network is adjustable so that the distance the bait is to be propelled may be varied by changing the angle of propulsion and the amount of force imparted to the sinker.

Another important objective of the invention is to provide a launching device utilizing resilient strips of rubber material as the projecting means, which strips may be easily replaced when necessary.

A still further objective of the invention to provide a device of this character having means for re-setting and loading the launching assembly with one simple hand or foot movement.

These and other objectives and advantages of the invention will be more fully understood upon a reading of the following specifications taken in view of the attached drawings wherein:

FIGURE 1 is a side elevation of the invention,
FIGURE 2 is a front elevation thereof;
FIGURE 3 is an enlarged partial side elevation of the main launching tube with parts broken away;
FIGURE 4 is a partial view of a hook element;
FIGURE 5 is an enlarged view in perspective of the launching cone;
FIGURE 6 is a cross sectional view taken along the line 6—6 of FIGURE 5; and
FIGURE 7 is a view in perspective of a leather strap connecting means.

Referring now more particularly to the drawings wherein like numerals indicate like parts, the numeral 10 indicates the launcher combination. The launcher is provided with a board-like flat base 12 to which at least one sharpened ground-engaging spike 14 is attached. The spike is of sufficient length and cross-section to secure the assembly when the spike is implanted into the sand, or earth, near a shoreline. As viewed in FIG. 5, the base 12 may be said to have a forward end 11 (facing the ocean) and a near end 13.

Immediately above the ground-engaging spike 14 is a journaled yoke 16 to which a telescoping barrel assembly 18 is pivotally secured by way of pin 20. The barrel assembly is a multi-sectional mechanism which is cocked to provide the necessary propelling force. The barrel assembly 18, near its lower end, is slotted at 22 (FIG. 3). Adjacent the slot 22 is a trigger latch 24 pivotally mounted to the bottom of the barrel assembly 18 about a shaft 26. Latch 24 is biased in a counter clockwise direction, as viewed in FIG. 3, by way of a coil spring about shaft 26. The coil spring is not shown, but such an expedient is well known to those skilled in the art. Latch 24, at its other end, is provided with an aperture 28 to which a cable 30 is attached. The other end of cable 30 is attached to a rearwardly disposed foot pedal 38. Adjacent the rear end of base 12 is a second yoke 36 which pivotally supports the bell-crank foot pedal. The arm 40 of the bell-crank (nearest to the ocean) is apertured to receive cable 30, and the other arm 42 is flattened for easy engagement with an operator's foot.

Spaced intermediate the yokes 16 and 36 are a pair of yokes 38 and 38' to which a pair of perforated supporting struts 44 and 44' are pivotally mounted about pins 46 and 46'. These struts, with the barrel assembly, support the launcher in a manner hereinafter described.

Returning now to the barrel assembly 18, it is comprised generally of a base tube 46, an extension tube 48, and a rod 50 which is slidably and telescopically received within tubes 46 and 48. Rod 50 is equipped with a hook 52 at its lower end which is adapted to mate with latch 24 when the rod is fully received within tube 46. The hook is formed with a elongated bore 51 which threadedly receives the lower end of rod 50. In this manner the overall length of the rod-hook assembly can be varied. Tubes 46 and 48 are fixedly secured by way of their threaded ends and the threaded connection strap 49. Tube 46 is formed with a set of apertures 47 at its upper end to receive a safety pin 53. Likewise, rod 50 is formed with a transverse aperture 57 which will mate with apertures 47 when rod 50 is depressed to its hook-engaging position. By inserting the safety pin 53 into these apertures, the rod 50 is positively secured in its lower position.

A box-like framing structure 54 is provided to connect the rod holding device 56 to the launching barrel 46. The framing member is four-sided, having a front 55a, a rear 55b, and sides 55c and 55d. The front 55a is fixedly secured to tube 46 at points 58 and 60. A pair of second perforated bracing struts 62 and 62' are connected to the rear corners of the frame member and extend downwardly therefrom. The struts 62 and 62' telescopically receive the smaller struts 44 and 44', and their combined length may be varied by selecting different sets of perforations and inserting the pins 65 and 65'. By so adjusting the amount the larger struts receive the smaller struts, the angle between the ground and the barrel assembly 18 may be varied. At the rear end, member 54, midway along side 55b, a pair of spring clips 64 and 66 receive a casting rod 70. The casting rod is of a conventional design and is equipped with a take-off reel 72 and a fishing line 74.

Adjacent point 58, the framing member is provided with an apertured yoke 76 about which an operating lever 78 is pivotally attached.

At the front corners of the framing member are a pair of upwardly and forwardly extending arms 81 and 83. At their outermost ends arms 81 and 83 are connected to the free end of rod 50 by way of resilient strips 84 and 86. The strips are formed of wide, twisted, rubberband-like members, as best seen in FIG. 5.

A cone assembly comprised of a circular plate 88 and a counter-bored cup 90 is attached to the outermost end of rod 50 by way of threads 92. About the circumference of plate 88 are a pair of oppositely disposed lugs 94 and 96 to receive the previously mentioned resilient strips 84 and 86. The fishing line 74 is wrapped around the outer surface of cup 90 and shallow, thread-like grooves 104 are provided for that purpose. The upward and outward taper of the outside surface of cup 90 should be noted because it permits orderly pay-out when the sinker is propelled. In the type of fishing line under discussion, the lure or bait is connected at a point H several feet from the end of the line, and a sinker or weight 100 is attached to the end of the line.

As seen best in FIG. 7, a connecting strap 106 and a cable 108 are provided to connect rod 50 to the cocking lever 78. The strap 106 is provided with a first aperture 110 which receives rod 50 below plate 88, and a second larger aperture 112 which is adapted to receive the cup 90 above plate 88. That portion of leather between the apertures bears uniformly against plate 84 and provides an efficient transfer of movement from the cocking lever 78. The cable 108 is connected to the strap at 114 by any conventional means.

In operation, the launcher is carried to a point adjacent a shoreline and spike 14 is firmly implanted in the ground. The desired angle of elevation between the ground and the barrel assembly 18 is adjusted by way of telescoping struts 44, 44', 62, and 62'. The fishing rod 70 is affixed to clips 64 and 66 and line 74 is payed-out, as shown in FIG. 1.

The line 74 is wrapped about the outer surface of cup 90 and the sinker 100 is placed within the counter bore 98. At this time the launcher is ready to be cocked. To cock the mechanism, lever 78 is merely depressed to the dotted line position shown in FIG. 1. When fully cocked, hook 24 engages hook 52 of the rod 50. As previously described, the safety pin 53 can be inserted until it is desired to launch the lure. With the safety pin out, the operator walks to the rear of the assembly, unhooks his casting rod therefrom, and launches his line by depressing the foot pedal 42. For subsequent launchings, the above procedure is repeated. In the event the launchings fall too long or too short, the amount of tension developed by the straps can be varied by adjusting the overall length of the rod 50 and hook 52.

In a general manner, while there has been disclosed in the above description, what is deemed to be the most practical and efficient embodiment of the invention, it should be well understood that the invention is not limited to such an embodiment as there might be changes made in the arrangement, disposition and form of the parts without departing from the principle of the present invention as comprehended within the scope of the accompanying claims.

I claim:

1. A launcher for propelling the weighted end of the fishing line of a casting rod comprising, an elongated base having a forward section and a rearward section, a barrel having its lower end pivotally secured to said forward section, a substantially rigid framing structure attached to said barrel at a point above said base, a pair of telescoping struts extending downwardly from said framing structure, means pivotally securing said struts to said rearward section, a rod having a free upper end and a lower end slidably received in said barrel, said rod having an uncocked position wherein only said lower end is received in said barrel, and a cocked position wherein all but the upper end is received in said barrel, a pair of arms extending upwardly from said framing structure and on opposite sides of said rod, resilient members connecting each of said arms to said rod and normally maintaining said rod in said uncocked position, first means to depress said rod into said cocked position against the bias of said resilient members and second means for suddenly releasing the force of said bias, and third means on said rod for receiving said weighted end whereby when said bias is released said weighted end will be propelled with said rod.

2. A launcher for propelling the weighted end of the fishing line of a casting rod, comprising an elongated base having a forward section and a rearward section, an earth-engaging spike extending downwardly from said base, a barrel having its lower end pivotally secured to said forward section immediately above said spike, a substantially rigid framing structure having a forward end attached to said barrel at a position above said base, a pair of longitudinally adjustable telescoping struts extending downwardly from the rearward end of said framing structure, means pivotally securing said struts to said rearward section and to said rearward end, a rod having an upper free end and a lower end slidably received in said barrel, said rod having an uncocked position wherein only said lower end is received in said barrel, and a cocked position wherein all but the upper end is received in said barrel, a pair of arms extending upwardly from said forward end of said framing structure and on opposite sides of said rod, resilient members connecting each of said arms to said rod and normally maintaining said rod in said uncocked position, first means to depress said rod to said cocked position against the bias of said resilient members and second means for suddenly releasing the force of said bias, and third means on said rod for receiving said weighted end whereby when said bias is released said weight will be propelled with said rod.

3. A launcher for propelling the weighted end of the fishing line of a casting rod comprising, an elongated base having a forward section and a rearward section, a barrel having a lower closed end pivotally secured to said forward section, a substantially rigid framing structure attached to said barrel at a point above said base, a pair of longitudinally adjustable struts extending downwardly from said framing structure, means pivotally securing said struts to said rearward section, a rod having a free upper end and a lower end slidably received in said barrel, said rod having an uncocked position wherein only said lower end is received in said barrel, and a cocked position wherein all but the upper end is received in said barrel, a pair of arms extending upwardly from said framing structure and on opposite sides of said rod, resilient members connecting each of said arms to said rod, and normally maintaining said rod in said uncocked position, first means to depress said rod into said cocked position against the bias of said resilient members and second means for suddenly releasing the force of said bias, said rod having a depression at its outer end for receiving said weighted end whereby when said bias is released said weight will be propelled with said rod.

4. A launcher for propelling the weighted end of the fishing line of a casting rod comprising, a base, a barrel having a lower end pivotally connected to said base, a rod slidably received in said barrel and having a cocked position and an uncocked position, said rod having a free end projecting from said barrel, a cup attached to the free end of said rod, said cup having an outwardly flared outer surface about which said fishing line is wrapped and a depression to receive said weighted end, means to propel said rod from its cocked position to its uncocked position at great speeds, whereby said weighted end is thrown from said cup as said line unreels from said outer surface.

5. A launcher for propelling the weighted end of the fishing line of a casting rod comprising, a base, a barrel having a lower closed end pivotally connected to said base, a rod slidably received in said barrel and having a cocked position and an uncocked position, said rod having a free end projecting from said barrel, a cup attached to the free end of said rod, said cup having an outwardly flared outer surface about which said fishing line is wrapped and a depression to receive said weighted end, said rod being substantially wholly received in said barrel in said cocked position and only the lower end received in said uncocked position, a biasing means normally holding said rod in the uncocked position, manually operated cocking means for moving said rod to said cocked position in opposition to said biasing means, and releasable lock means for holding said rod in said cocked position.

6. A launcher for propelling the weighted end of a fishing line of a casting rod comprising, a base, a barrel having a lower end pivotally connected to said base, a rod slidably received in said barrel and having a cocked position and an uncocked position, said rod having a free end projecting from said barrel, a member at said free end about which said fishing line is wrapped, said member including first means facilitating the orderly unreeling of said line, and including second means for supporting said weighted end, third means to propel said rod from its cocked position to its uncocked position at great speeds, whereby said weighted end is thrown from said second means as said line unreels from said first means.

References Cited in the file of this patent

UNITED STATES PATENTS 2,869,273  Thorburn _____ Jan. 20, 1959